United States Patent [19]

Komurasaki et al.

[11] Patent Number: 4,508,079

[45] Date of Patent: Apr. 2, 1985

[54] KNOCKING CONTROL SYSTEM FOR INTERNAL COMBUSTION ENGINE

[75] Inventors: Satoshi Komurasaki; Atsushi Ueda; Yoshinobu Morimoto; Youichi Kadota, all of Hyogo, Japan

[73] Assignee: Mitsubishi Denki Kabushiki Kaisha, Tokyo, Japan

[21] Appl. No.: 480,647

[22] Filed: Mar. 31, 1983

[30] Foreign Application Priority Data

| Mar. 31, 1982 | [JP] | Japan | 57-55846 |
| May 27, 1982 | [JP] | Japan | 57-91657 |
| Jun. 14, 1982 | [JP] | Japan | 57-103646 |
| Jun. 19, 1982 | [JP] | Japan | 57-106403 |
| Jun. 19, 1982 | [JP] | Japan | 57-106429 |

[51] Int. Cl.³ .................. F02P 5/14; F02P 11/02; F02M 59/20; F02D 5/04
[52] U.S. Cl. ..................... 123/425; 123/422
[58] Field of Search ............ 123/425, 422, 418, 419, 123/423

[56] References Cited

U.S. PATENT DOCUMENTS

| 4,328,779 | 5/1982 | Hattori et al. | 123/425 |
| 4,344,400 | 8/1982 | Asano | 123/425 |
| 4,346,586 | 8/1982 | Furrey | 123/425 |
| 4,347,820 | 9/1982 | Deleris | 123/425 |
| 4,364,353 | 12/1982 | Fiala | 123/425 |
| 4,370,963 | 2/1983 | Iwata et al. | 123/425 |
| 4,377,999 | 3/1983 | Komurasaki et al. | 123/425 |
| 4,385,607 | 5/1983 | Honiden et al. | 123/425 |
| 4,397,285 | 8/1983 | O'Neill | 123/425 |
| 4,425,890 | 1/1984 | Yamaguchi | 123/422 |
| 4,428,344 | 1/1984 | Focht | 123/422 |

Primary Examiner—Raymond A. Nelli
Attorney, Agent, or Firm—Sughrue, Mion, Zinn, Macpeak, and Seas

[57] ABSTRACT

A knocking control system for an I.C.E. includes a knock detector, and an apparatus for retarding the timing in response to the detection of knocking. This apparatus includes an arithmetic device and a memory map for storing retard values and accessed according to intake pressure (engine load) and r.p.m. values. The map value is read out by the arithmetic means is generally corrected on the basis of the present knock value, and the corrected retard value is used to control ignition and may be stored in the memory map to replace the read out value.

20 Claims, 53 Drawing Figures

KNOCKING CONTROL SYSTEM FOR INTERNAL COMBUSTION ENGINE

BACKGROUND OF THE INVENTION

The present invention relates to a knocking control system for an internal combustion engine, and more particularly to a knocking control system for controlling the knocking of an internal combustion engine while determining the most proper ignition position of the engine by the use of a microprocessor.

In the internal combustion engine of an automobile, a turbo-supercharged system has frequently been adopted in recent years so as to reduce the fuel consumption rate and improve output power, but the engine is made more liable to knock in the supercharged region as a result of the adoption of that system.

In order to obviate the knocking phenomenon, moreover, it is sufficient to retard the ignition timing. Retarding may be effected by adding a mechanism to the distributor to perform the retarding action in response to the pressure in the intake pipe of the engine even in the supercharged region. On the other hand, the knocking phenomenon is not only highly dependent upon the state of the engine but also innegligibily influenced by variations in the retarding mechanism of the distributor. If the distributor is intended to perform an ignition timing control function such as can satisfy all of the aforementioned points, the ignition timing is retarded more than necessary to make it impossible to achieve highly efficient running which is the intrinsic object of the turbo-supercharged system.

A knock control system is intended to improve the above problems. According to such a control system, the engine is equipped with a vibratory acceleration detector called a "knock sensor", by which the knocking state is discriminated to retard the reference ignition position signal of the distributor to a necessary extent so that the states of and variations in the engine and the distributor may be offset to determine the largest angular advance position that does not invite knocking. As described above, however, the knocking phenomenon is highly influenced by the conditions of the engine; such as the load state, the r.p.m., the air/fuel ratio, the intake moisture and the cooling water temperature of the engine. The system of the prior art, which has failed to take those respective conditions into consideration, effects control at a more retarded side than the most proper ignition timing so that it cannot achieve highly efficient running of the engine.

SUMMARY OF THE INVENTION

In view of the above, an object of the present invention is to provide a knocking control system capable of suppressing the occurrence of knocking in accordance with a control signal corresponding to a knocking detection signal produced in response to the detection of the occurrence of knocking.

The foregoing, as well as other objects of the present invention are met by the provision of a knocking control system for an internal combustion engine, which includes: a vibratory acceleration sensor for detecting the vibratory acceleration of an internal combustion engine to produce a vibratory signal; means for removing a noise signal from the vibratory signal to produce a knocking signal having a signal level representing the knocking level, means for detecting the load condition of the internal combustion engine, means for detecting the r.p.m. of the internal combustion engine; means for storing a reference control value for suppressing knocking, the reference control value corresponding to the load condition and the r.p.m.; and an arithmetic means for producing a knocking control signal and the reference control value, the occurrence of knocking being prevented according to the knocking control signal.

DETAILED DESCRIPTION OF THE PREFERRED EMBODIMENTS

Hereinafter, preferred embodiments of the present invention will be described with reference to the accompanying drawings. While knocking may be caused by a variety of reasons as described above, the following is described for the case of controlling the ignition timing, which is most frequently put into practice.

Figure 1:
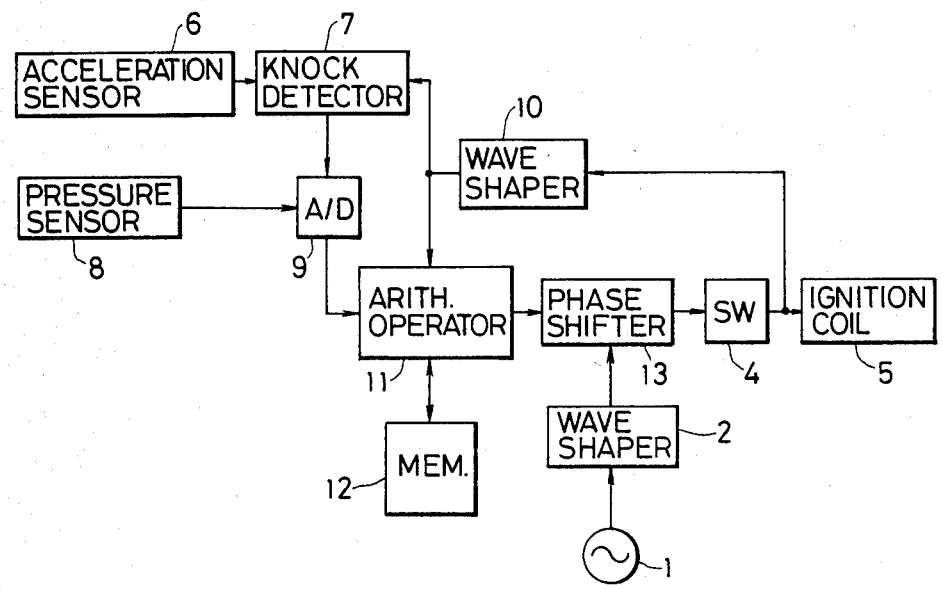
FIG. 1 is a block diagram showing a first embodiment of a knocking control system for an internal combustion engine according to the present invention.

In FIG. 1, reference numeral 1 indicates an ignition signal generator for generating a reference ignition signal in accordance with the revolutions of an internal combustion engine. Numeral 2 indictes a waveform shaper which is made receptive of the reference ignition signal from the ignition signal generator 1 to shape its waveform and control its closed angle to thereby generate an ignition pulse having a desired width. Numeral 3 indicates a phase shifter for shifting the phase of the ignition pulse coming from the waveform shaper 2 to the retarded side in accordance with the control signal coming from a later-described arithmetic operator 11 and for generating a phase-shifted ignition pulse. Numeral 4 indicates a switch circuit for controlling the power supply to an ignition coil in response to the ignition pulse from the phase shifter 3. Numeral 6 indicates an acceleration sensor which is attached to the internal combustion engine for detecting the vibratory acceleration of the engine. Numeral 7 indicates a knock detector for selecting the knock component, which has been generated in accordance with the knocking of the engine, from the detected output of the acceleration sensor 6 to thereby generate a knocking signal at a level corresponding to the intensity of the knock.

Numeral 8 indicates a pressure sensor for detecting the pressure in the intake pipe of the internal combustion engine to generate a pressure signal corresponding to that pressure. Numeral 9 indicates an A/D converter for converting the respective outputs of the aforementioned knock detector 7 and pressure sensor 8 into digital values in accordance with their levels. Numeral 10 indicates a waveform shaper which is made receptive of the voltage waveform at the drive terminal of the ignition coil 5 for feeding a predetermined time pulse to the knock detector 7 and the arithmetic operator 11. The device 11 determines the running state of the engine from the output of the pressure sensor 8 fed through the A/D converter 9 and from the output of the waveform shaper 10, and the knock intensity from the output of the knock detector 7 fed through the A/D converter 10, and further determines a reference control signal from a memory 12 to thereby generate a control signal. The memory 12 is controlled by the arithmetic operator 11 to store the reference control signal therein.

Figure 2:
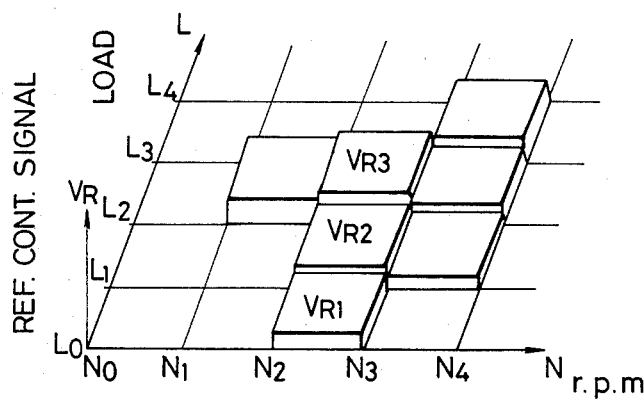
FIG. 2 is a diagram illustrating a reference control signal stored in a memory shown in FIG. 1.
Figure 3:
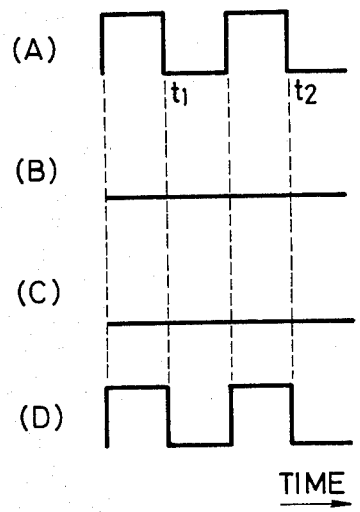
FIGS. 3(A) to 3(D), FIGS. 4(A) to 4(D) and FIGS. 5(A) to 5(D) are diagrams each illustrating the waveform of a signal appearing at an output of a circuit component.
Figure 4:
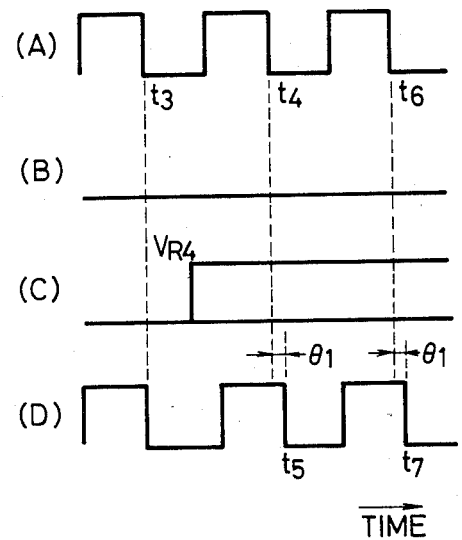
Figure 5:
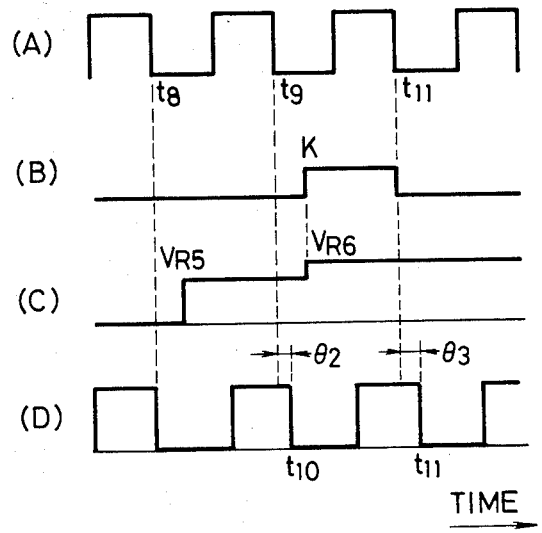

FIG. 2 illustrates the reference control signal stored in the memory 12, and FIGS. 3, 4 and 5 are charts illustrating operating waveforms at the respective portions of FIG. 1.

Firstly, the operation of an igniter unit composed of the ignition signal generator 1—the ignition coil 5 will be described. The ignition signal generator 1 generates an ignition signal in accordance with the revolutions of the internal combustion engine, and the waveform shaper 2 shapes the waveform thereof and controls the closed angle of the aforementioned ignition signal to generate an ignition pulse having a desired width. This ignition pulse is fed through the phase shifter 3 to the switch circuit 4 so that the switch circuit 4 will control the power supply to the ignition coil 5 in response to the ignition pulse. When the power supply to the ignition coil 5 is interrupted, there is generated an ignition voltage, by which the internal combustion engine is ignited and run.

The pressure sensor 8 detects the pressure in the intake pipe of the internal combustion engine to generate a pressure signal corresponding to the pressure detected. This pressure signal is converted by the converter 9 into a digital value, which is fed as a signal indicative of the load state of the internal combustion engine to the arithmetic operator 11. Since the intake pipe pressure of the internal combustion engine varies sharply in accordance with the load state of the engine, the engine load state can be determined from the level of the pressure signal obtained from the pressure sensor 8 by detecting the intake pipe pressure.

The waveform shaper 10 operates in accordance with the voltage at the drive terminal of the ignition coil 5 to generate a pulse of constant duration at the ignition timing.

The vibration acceleration sensor 6 is attached to the internal combustion engine to detect the vibrations of the engine at all times. The output detected by the acceleration sensor 6 is composed, in a superposed form, of a noise signal (e.g., which is detected in accordance with the operation of the valves) due to mechanical noise generated by the operation of the engine, and a knocking component due to vibrations which are caused by knock.

The knock detector 7 selects the knock signal from the detected output, to generate a knock signal at a level according to the knocking intensity. This knock signal is converted by the A/D converter 9 into a digital signal and is fed to the arithmetic operator 11. On the other hand, the output of the aforementioned knock detector 7 is reset by the constant-duration pulse coming from the waveform shaper 10. The arithmetic operator 11 determines the load state of the engine from the pressure signal, which is fed from the pressure sensor 8 through the A/D converter 9, and the r.p.m. of the internal combustion engine from the period of the constant duration pulse coming from the waveform shaper 10, to thereby judge the running state of the engine. The operator 11 further detects the occurrence of knocking from the knock signal which is fed from the knock detector 7 through the A/D converter 9.

Now, if knocking occurs in the internal combustion engine, the arithmetic operator 11 determines the running state of the internal combustion engine from the pressure signal coming from the pressure sensor 8 and the constant duration pulse coming from the waveform shaper 10, and causes the knock signal, which comes from the knock detector 7 and corresponds to the level of the aforementioned knocking, to be initially stored as a reference control signal for the aforementioned running state in the memory 12. In the respective running states in which knocking occurs in the internal combustion engine, the knock signals corresponding to the aforementioned running states are stored in the memory 12 to thereby prepare a map of reference control signals corresponding to the respective running states.

FIG. 2 presents one example of this map, i.e., the content of the memory 12, of reference control signals made to correspond to the aforementioned running states. Here, the running state is determined by the loads upon and the r.p.m. of the internal combustion engine, wherein r.p.m. is divided from $N_0$ to $N_4$, for instance, and the load is divided from $L_0$ to $L_4$. For the range of r.p.m. $N_2$ to $N_3$, for example, the reference control signals stored are indicated at $V_{R1}$ for the case of a load of $L_0$ to $L_1$, at $V_{R2}$ for the case of a load from $L_1$ to $L_2$, and at $V_{R3}$ for the case of a load from $L_2$ to $L_3$. Moreover, the reference control signals are increased in the consecutive order $V_{R1}$, $V_{R2}$, and $V_{R3}$ in accordance with the increase in the load.

Here, the aforementioned load ranges for the storage of reference control signals are limited to that region in which knocking occurs in the internal combustion engine, so that the storage cpacity of the memory 12 may be reduced to enhance the efficiency of the memory 12.

The description will now proceed with reference to the waveform charts of FIGS. 3, 4 and 5.

In the waveform charts: letter (A) indicates the output of the waveform shaper 2; letter (B) indicates the output of the knock detector 7; letter (C) indicates the output of the arithmetic operator 11; and letter (D) indicates the output of the phase shifter 3.

FIG. 3 illustrates the case in which no knocking occurs in the internal combustion engine.

Since no knocking occurs in this case, neither the output (as indicated at (B) of FIG. 3) of the knock detector 7 nor the output (as indicated at (C) of FIG. 3) of the arithmetic operator 11 assumes any value. As a result, phase shift control is not conducted at the phase shifter 3 so that an ignition pulse (as indicated at (D) of FIG. 3) in phase with the ignition pulse (as indicated at (A) of FIG. 3) of the output of the waveform shaper 2 is fed to the switch circuit 4. This switch circuit 4 powers the ignition coil 5 in response to the ignition pulse.

As a result, the power supply to the ignition coil 5 is interrupted at reference instances $t_1$ to $t_2$ so that an ignition voltage is generated.

FIG. 4 is a chart showing waveforms in a running case in which knocking control is required. In this case, after ignition at an instance $t_3$, the running state comes into a state requiring knocking control, and the arithmetic operator 11 determines the running state from the pressure signal level, which is fed from the pressure sensor 8 through the A/D converter 9, and from the period of the constant duration pulse coming from the waveform shaper 10, so that it reads a reference control signal $V_{R4}$ (as indicated at (C) of FIG. 4) corresponding to this running state out of the memory 12. In response to the reference control signal $V_{R4}$, the phase shifter 3 generates an ignition pulse (as indicated at (D) of FIG. 4) prepared by shifting the phase of the ignition pulse (as indicated at (A) of FIG. 4) coming from the waveform shaper 2 by an angle $\theta_1$ to the retarded side. In response to the ignition pulse (D), the switch circuit 4 controls the power supply to the ignition coil 5 so that the ignition is generated to run the internal combustion engine at instants $t_5$ and $t_7$, which are respectively retarded by the angle $\theta_1$ from reference instants $t_4$ and $t_6$. As a result, the internal combustion engine is run without knocking.

FIG. 5 is a chart illustrating the case in which the combustion states are more or less different among the engine cylinders so that control by the reference control signals illustrated in FIG. 4 becomes more or less short.

Immediately after an ignition instant $t_8$, the arithmetic operator 11 detects the load upon and the r.p.m. of the engine, respectively, from the level of the pressure signal coming from the pressure sensor 8 and from the period of the constant duration pulse coming from the waveform shaper 10 and reads the reference control signal corresponding to that running state out of the memory 12, so that it generates a control signal $V_{R5}$ (as indicated at (C) of FIG. 5). In response to this control signal $V_{R5}$, the phase shifter 3 generates an ignition pulse (as indicated at (D) of FIG. 5) prepared by shifting the phase of the ignition pulse (as indicated at (A) of FIG. 5) coming from the waveform shaper 2 by an angle $\theta_2$ to the retarded side.

In response to the ignition pulse (D), the switch circuit 4 supplies power to the ignition coil 5 so that the ignition voltage is generated to run the engine at an instant $t_{10}$ delayed by $\theta_2$ from a reference instant $t_9$.

However, a knock signal K is generated by the knock detector 7 in case the combustion state slightly fluctuates, notwithstanding that ignition is effected at the instant $t_{10}$ delayed by the aforementioned angle $\theta_2$, so that knocking at a low level is continuously caused. In response to the knock detection K, the arithmetic operator 11 generates a control signal $V_{R6}$ prepared by adding a correction corresponding to that level to the aforementioned control signal $V_{R5}$. As a result, subsequent ignition is effected with a correction at an instant $t_{12}$ delayed by an angle $\theta_3$ from a reference ignition instant $t_{11}$ so that knocking can be sufficiently suppressed. Thus, the angle $\theta_3$ is larger than the angle $\theta_2$, and the difference therebetween, i.e., the correcting angle is expressed by $(\theta_3-\theta_2)$, which corresponds to the level of the knocking signal K. The value $V_{R6}$ may be used to update the memory. The aforementioned memory is usually used commonly for other applications such that plural kinds of data are stored in one memory. Therefore, the memory 12 must be designed so as to require a minimal storage capacity and operate with a small capacity. As is apparent from the foregoing description of the operation thereof, therefore, the memory 12 operates for storage only in the running state in which knocking occurs in the engine.

Since knocking usually occurs in association with the loaded state of the engine, the aforementioned memory 12 is desirably limited such that it operates in the high load range, wherein the load on the engine is higher than a predetermined level, to thereby reduce its capacity and enhance its use efficiency.

In the embodiment thus far described, where the actual variable to be controlled varies more than the predetermined value from the reference control signal read out of the memory 12, the reference control signal can be corrected for a large charge in knock causing factors of the internal combustion engine by correcting the reference control signal value of the memory 12 to thereby effect a correction for, e.g., seasonal change in the aforementioned knock causing factors, so that reference control signals having proper values can be stored. For the initial values of the reference control signals of the memory 12, on the other hand, it is sufficient to either store values which are determined in advance from the design values of the internal combustion engine or to uniformly store the average of those values. In either case, initial controllability can be improved over the case in which the initial values are set to zero.

In the foregoing embodiment, moreover, the output of the knock detector 7 is reset at each ignition timing. This resetting operation should not limited to this method, but may instead be effected at an ignition timing after knocking has occurred. In the alternative, correction control may be carried out by sequentially adding the detected signals and by detecting the change, when knocking occurs. In this instance, the resetting operation may be conducted when the output reaches a predetermined value.

Despite the fact that there are many knock causing factors, moreover, either ignition timing control as exemplified in the above embodiment, or air/fuel ratio control using a fuel control system is preferred. This is because a number of systems relating to ignition timing control or air/fuel ratio control have been put into practice, and such types of systems can be realized with ease and also at a low cost.

Figure 6:
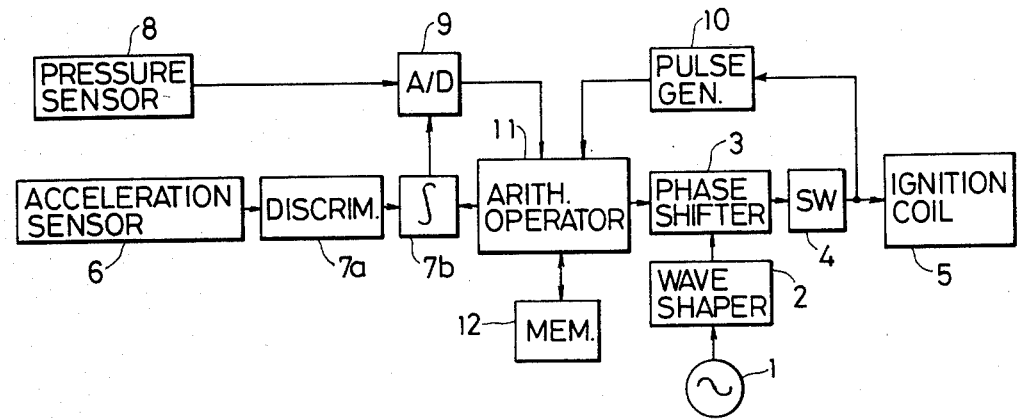
FIG. 6 is a block diagram showing a second embodiment of the present invention.

A second embodiment of the present invention will now be described with reference to FIGS. 6 to 8. FIG. 6 is a block diagram showing a second embodiment of the invention obtained by modifying the knock detector 7 of the first embodiment. More specifically, a series circuit of a discriminator 7a for discriminating a noise component from the output of the acceleration sensor 6, and an integrator 7b for integrating the output of the discriminator 7a to obtain an analog voltage whose amplitude represents the intensity of knocking is provided, instead of the knock detector 7.

Figure 7:
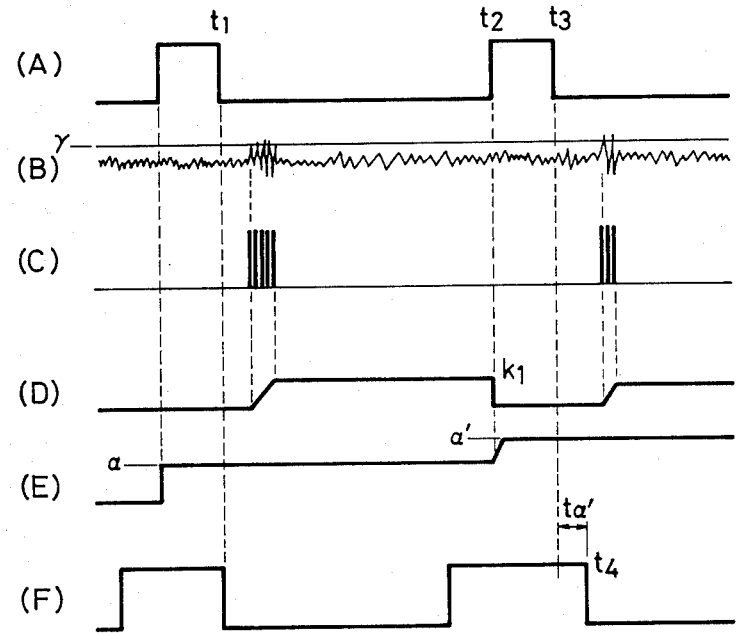
FIGS. 7(A) to 7(F) are diagrams each illustrating the waveform of a signal appearing at a point in the embodiment of FIG. 6.

In FIG. 7, illustrating the operation waveforms of this system, chart (A) illustrates the output waveform of the pulse generator 10, i.e., a pulse having a predetermined time duration synchronized with the ignition timing. Chart (B) illustrates the output waveform of the acceleration sensor 6 for detecting vibrations of the engine. Chart (C) illustrates the output waveform of the discriminator 7a, i.e., the knocking signal, which is extracted from the output signal of the acceleration sensor 6. Chart (D) illustrates the output waveform of the integrator 7b, i.e., the integrated waveform prepared by integrating the knocking signal indicated in the chart (C) for one ignition period. Chart (E) illustrates the output waveform of the arithmetic operator 11, i.e., the retardation of the ignition timing of the engine. Chart (F) illustrates the output waveform of the switching circuit 4, i.e., the ignition timing of the engine.

Figure 8:
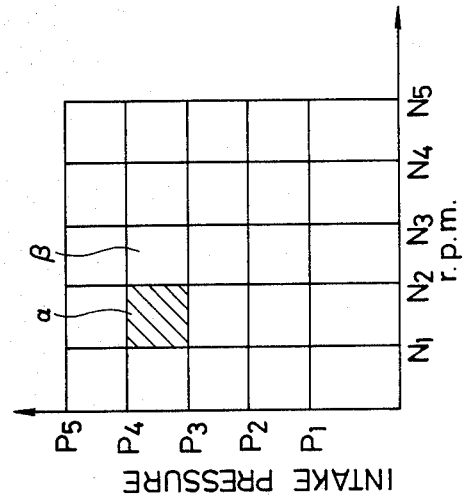
FIG. 8 is a diagram illustrating a characteristic of a memory shown in FIG. 6.

On the other hand, FIG. 8 illustrates ignition timing retardation values in the memory 12, where the engine state is divided into r.p.m. states $n_1$ to $n_5$ and pressure states $P_1$ to $P_5$ of the intake to form a plurality of regions in which are stored ignition timing retardation value ($\alpha$, $\beta$, and so on).

The operation of the system thus constructed will now be described. The operation of the igniter unit composed of the ignition signal generator 1—the ignition coil 5 has been described in the foregoing description. Basically, the ignition signal generator 1 generates an ignition signal in accordance with the revolutions of the engine, and the waveform shaper 2 shapes the waveform of and controls the closed angle of this ignition signal to generate an ignition pulse having the desired width. The phase shifter 3 receives an ignition timing control signal from the arithmetic operator 11 and shifts the ignition pulse coming from the waveform shaper 2 to the retarded side to feed the phase-shifted pulse to the switch circuit 4. The switch circuit 4 interrupts the power supply to the ignition coil 5 in response to the phase-shifted ignition pulse so that an ignition voltage is generated at the ignition coil 5, when the power supply is interrupted, to cause ignition.

The acceleration sensor 6 attached to the body of the internal combustion engine detects the vibrations of the engine at all times. The output thus detected contains signals having a variety of frequency components, as shown in FIG. 7(B). More specifically, its output is composed of a knocking component, which is caused by vibration in accordance with knocking, and a noise signal caused by mechanical vibrations resulting from the operation of the engine. The discriminator 7a selects the knocking signal by comparing the output of the acceleration sensor 6 with a detection reference value $\gamma$, as illustrated in FIG. 7(B), to thereby generate a pulse signal illustrated in FIG. 7(C) simultaneously with the occurrence of knocking. As a result, if the engine frequently knocks, the pulse signals fed from the discriminator 7a are increased so that an analog voltage according to the frequency of knocking can be generated by integrating the pulse signal by the use of the integrator 7b. More specifically, the output signal of the integrator 7b illustrated in FIG. 7(D) indicates the intensity of knocking of the engine and is converted into a digital value by the A/D converter 9 at each ignition period of the engine in synchronism with the output of the pulse generator 10, as illustrated in FIG. 7(A), until the digital output is fed to the arithmetic operator 11. A knocking value $k_1$ appearing in FIG. 7(D) indicates the extent of the knocking, which has been caused in the engine by ignition at an instant $t_1$, and is introduced as data to judge whether or not ignition at the instant $t_1$ is timely, into the arithmetic operator 11. Afterwards, the integrator 7b is reset by a control signal generated by the arithmetic operator 11 in synchronism with the output of the pulse generator 10, so that it may be prepared for the occurrence of knocking accompanying a subsequent ignition.

On the other hand, the pressure sensor 8 detects the intake pressure of the engine to generate a pressure signal corresponding to the pressure detected. This pressure signal is converted into a digital value by the action of the A/D converter 9 and is fed as a signal indicative of the load state of the engine to the arithmetic operator 11. Since the intake pressure is varied in sharp response to the load state of the engine, it is possible to easily determine the engine load state from the level of the pressure signal of the pressure sensor 8. The arithmetic operator 11 determines the engine load state from the pressure signal of the pressure sensor 8, which is fed through the converter 9, and the r.p.m. of the engine from the period of the constant duration pulse of the pulse generator 10, to judge the running state of the engine from those data. Moreover, the arithmetic operator 11 reads the ignition timing retardation value corresponding to this running state out of the memory 12 and corrects this value in accordance with the extent of knocking of the engine, which is determined from the output of the integrator 7b, to thereby send the corrected value to the phase shifter 3 and to store the same as a new retardation value in the identical region of the memory 12.

For example, in a case where the r.p.m. of the engine at an instant $t_2$ (FIG. 7) is within $N_1$ and $N_2$ whereas the intake pressure is within $P_3$ and $P_4$, the running state of the engine is judged, in view of FIG. 8, to fall in the hatched region shown therein. The ignition timing retardation value $\alpha$ stored in that region is fed to the arithmetic operator 11. On the other hand, the knocking data of the engine at the instant $t_2$ is indicated by the knocking value $k_1$ appearing in FIG. 7(D), indicating that knocking having the extent or magnitude $k_1$ has been caused by ignition at the instant $t_1$. If ignition is caused with the same timing as the preceding ignition, therefore, knocking of the extent $k_1$ will be caused again. Thus, the arithmetic operator 11 corrects the retard control data, i.e., the ignition timing retardation value $\alpha$ which has been read out of the memory 12, in accordance with the knocking data $k_1$, and arithmetically determines a retardation value $\alpha'$, required for ignition at such a timing as precludes further knocking. The value $\alpha'$ is fed to the phase shifter 3, as illustrated in FIG. 7(E), and the stored value $\alpha$ in the memory is converted to the value $\alpha$.

The phase shifter 3 shifts the ignition pulse of the waveform shaper 2 so that ignition is effected at an instant $t_4$ retarded from a reference ignition instant $t_3$ by a period $t_{60}$, corresponding to the control value $\alpha'$ computed. If knocking is caused by ignition at the instant $t_4$, the knocking data likewise impact upon the subsequent ignition timing.

In the present embodiment, the output of the intergrator 7b is arithmetically processed at each ignition period. However, since said output is left at zero as long as no knocking occurs, it may be preliminarily judged whether or not the output is zero. Then, only when the output is not zero, i.e., when knocking occurs, is the output of the integrator 7b subjected to the A/D conversion and fed to the arithmetic operator 11, and the integrator 7b reset by the arithmetic operator 11. Thus, in case the arithmetic operator 11 performs other functions, it is not required to conduct knocking processing as long as knocking does not occur, so that the time period for other processing can be elongated.

A third embodiment of the present invention will be described with reference to FIGS. 9 to 22.

Figure 9:
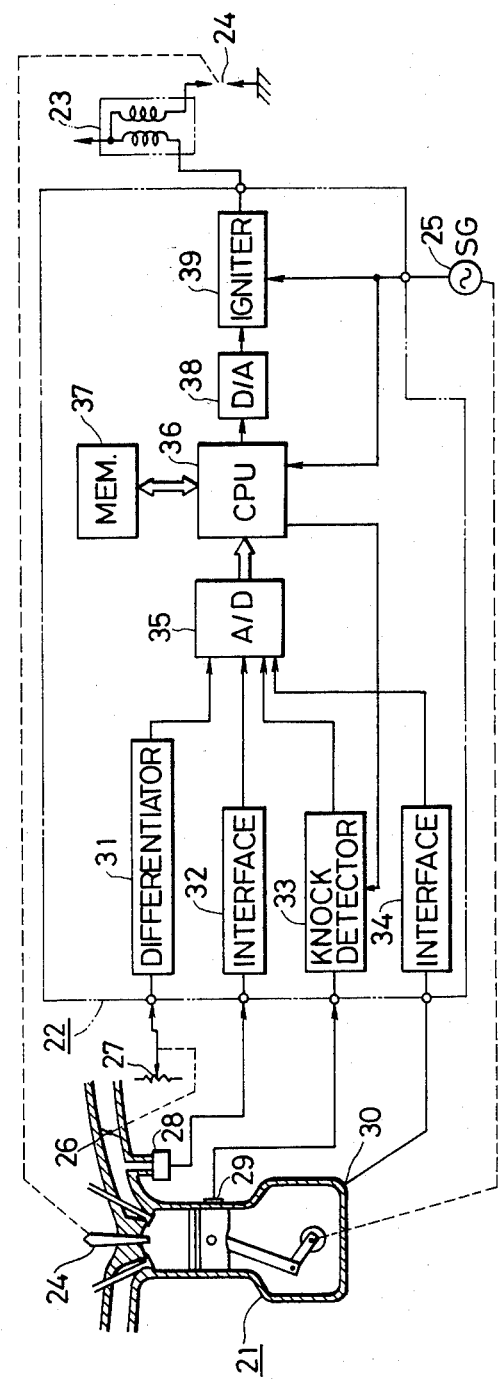
FIG. 9 is a diagram illustrating a third embodiment of a knocking control system according to the present invention.

In FIG. 9, reference numeral 21 indicates the internal combustion engine to be controlled; numeral 22 indicates a controller; numeral 23 indicates an ignition coil for supplying an ignition voltage to an ignition plug 24; and numeral 25 indicates a signal generator for a reference ignition position signal, which is attached to a distributor (not shown).

Moreover, reference numeral 26 indicates a throttle valve which is disposed in the intake of the aforementioned engine 21. Numeral 27 indicates a position sensor made coactive with the throttle valve 26. Numeral 28 indicates a pressure detector for detecting the pressure in the intake pipe. Numeral 29 indicates a vibratory acceleration detector (knock sensor) for detecting knocking of the engine 21. Numeral 30 indicates a water temperature sensor for detecting the temperature of engine cooling water.

Moreover, reference numeral 31 indicates a differentiator for differentiating the output voltage of the aforementioned position sensor 27 to detect a transitional state of the aforementioned engine 21. Numeral 32 indicates an interface circuit for receiving the output of the aforementioned pressure detector 28. Numeral 33 indicates a knock detector for extracting only the knocking signal from the output of the aforementioned knock sensor 29 to generate an analog signal corresponding to the extent of knock. Numeral 34 indicates an interface for receiving the output of the aforementioned water temperature sensor 30.

Further, numeral 35 indicates an A/D converter for converting the analog signals coming from the respective circuits 31–34 into digital signals. Numeral 36 indicates an arithmetic unit including a microcomputer for conducting controlling operations to generate a phase-delayed signal for effecting engine ignition timing at the most proper ignition position. Numeral 37 indicates a memory which is made operative to store both the program for the microcomputer 36 and the most proper ignition position data determined by the microcomputer 36 and which is connected to a power source at all times to hold the stored content. Numeral 38 indicates a D/A converter for converting the digital signal output of the microcomputer 36 into an analog signal. Numeral 39 indicates an igniter for controlling the power supply to the aforementioned ignition coil 23 in accordance with the output of the aforementioned signal generator 35 and for retarding the ignition timing by an angle corresponding to the output level of the D/A converter 38.

Figure 10:
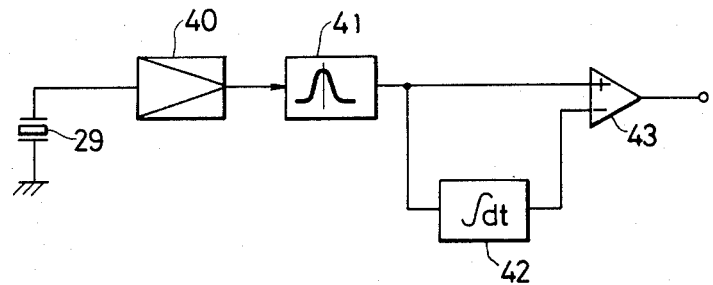
FIGS. 10 and 12 are diagrams showing a knocking detection circuit in detail.
Figure 11:
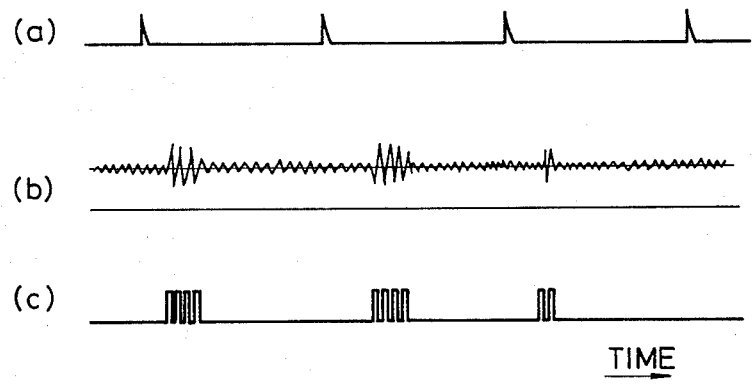
FIGS. 11(A) to 11(C) and FIGS. 13(A) to 13(D) are timing charts for descriptions with reference to FIGS. 10 and 12.
Figure 12:
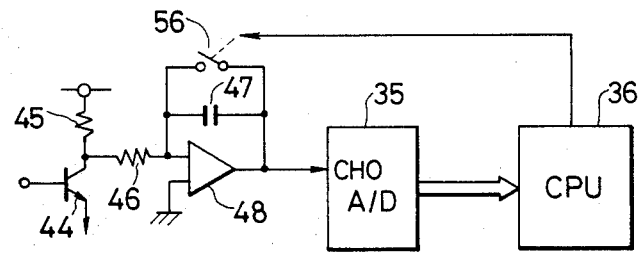
Figure 13:
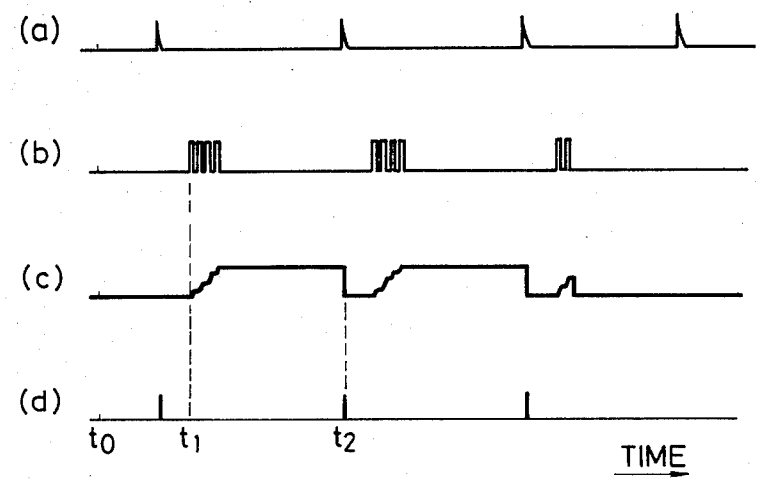

On the other hand, FIGS. 10 and 12 are diagrams showing the details of the aforementioned knock detector 33, and FIGS. 11 and 13 are timing charts respectively illustrating the operation of the devices of FIGS. 10 and 12.

In FIGS. 10 and 11, reference numeral 40 indicates an amplifier for amplifying the output of the aforementioned knock sensor 29. Numeral 41 indicates a band-pass filter for extracting only a signal having a frequency in the vicinity of a knocking component from the output of the knock sensor 29. Numeral 42 indicates an integrator for detecting the background level, which is at a noise signal level other than the knocking signal, from the output of that band-pass filter 41. Numeral 43 indicates a comparator for comparing the levels of the respective outputs of the band-pass filter 41 and the integrator 42 to generate a signal indicating knocking of the engine 21. In FIG. 11, (a) indicates the ignition signal; (b) indicates the output waveform of the knock sensor 29; and (c) indicates the output waveform of the comparator 43, which in turn indicates knocking.

In FIGS. 12 and 13, moreover, reference numeral 44 indicates a transistor which has its base fed with the output of the aforementioned comparator 43. Numeral 45 indicates a resistor. Numerals 46, 47 and 48 indicate a resistor, capacitor and operational amplifier which together construct an integrator. Numeral 56 indicates a switch adapted to be turned on and off by the aforementioned microcomputer 36 to thereby discharge the capacitor 47 and to reset the integrator. In FIG. 13: (a) indicates the ignition signal; (b) indicates the output waveform of the comparator 43, which in turn indicates knocking; (c) indicates the output waveform of the operational amplifier 48; and (d) indicates the waveform of the control signal for the switch 56.

Figure 14:
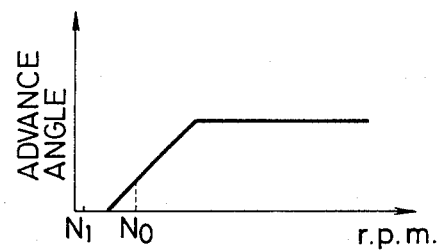
FIGS. 14 and 15 are characteristic diagrams showing output phase characteristics of a signal generating device.
Figure 15:
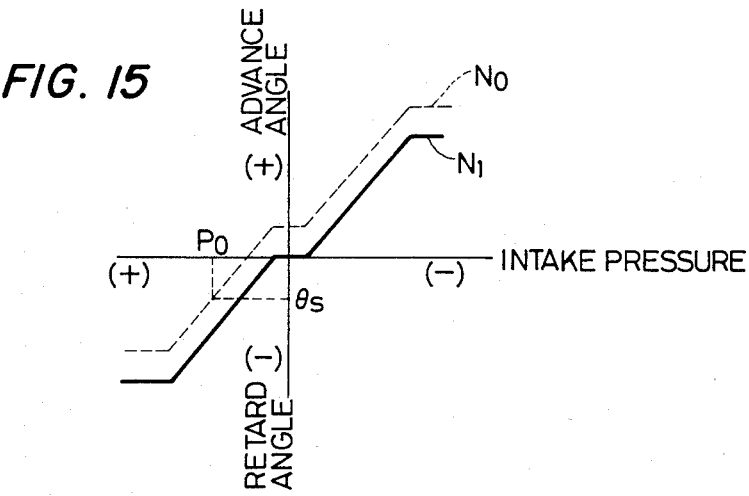

FIGS. 14 and 15 illustrate the output phase characteristics of the aforementioned signal generator 25. More specifically, FIG. 14 is a chart illustrating r.p.m. characteristics, in which the advance angle is plotted against the r.p.m. of the engine, and FIG. 15 is a chart illustrating the pressure characteristics, in which the advance angle is plotted against the pressure in the intake. In these figures, curves $N_0$ and $N_1$ correspond to a case in which the engine r.p.m. is changed.

Figure 16:
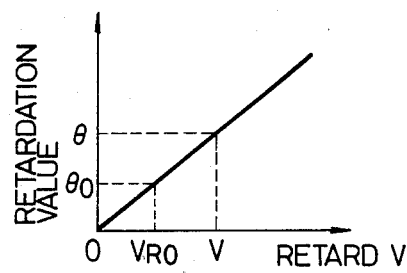
FIG. 16 is a diagram showing a retard angle characteristic of an ignitor section.
Figure 17:
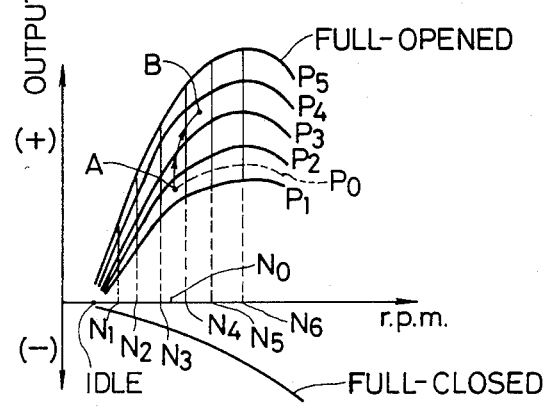
FIGS. 17 and 18 are diagrams showing a retard value memory.
Figure 18:
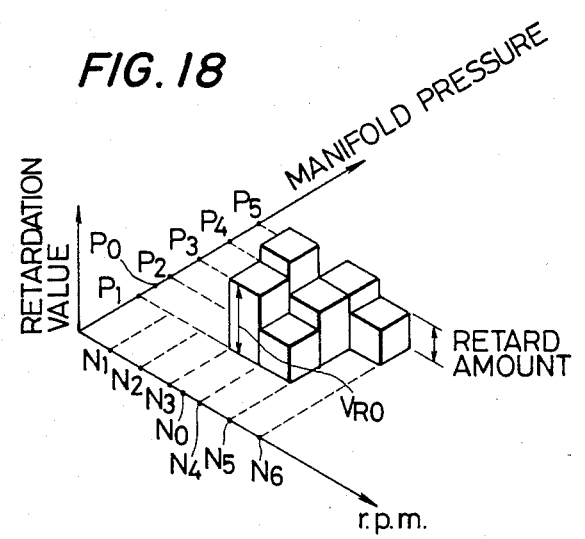

FIG. 16 is a chart illustrating the retard characteristics of the aforementioned ignitor 39 and shows that retardation is varied in accordance with an input analog quantity. FIG. 17 illustrates how the aforementioned microcomputer 36 divides the output characteristics of the engine, in which the intake pressure is divided and illustrated in the respective divided zones, plotting the engine r.p.m. on the abscissa and the output on the ordinate. FIG. 18 is a conceptual chart of retardation values stored in the aforementioned memory 37 in a manner so as to correspond to the engine running zones illustrated in FIG. 17.

Figure 19:
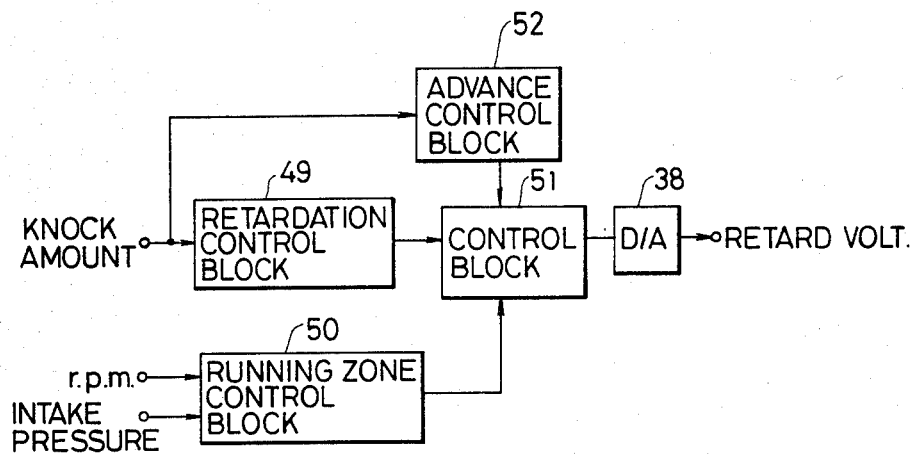
FIG. 19 is a block diagram showing the control system in an ordinary state.
Figure 20:
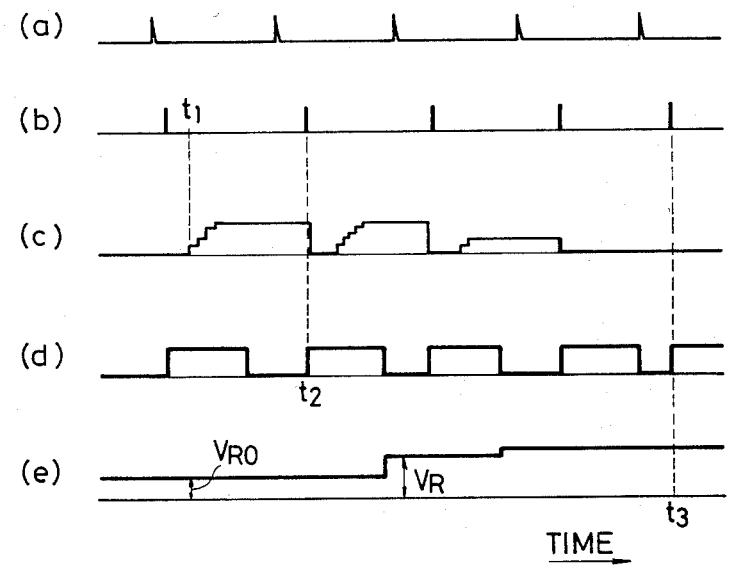
FIGS. 20(A) to 20(E) are timing charts for the description with reference to FIG. 19.
Figure 21:
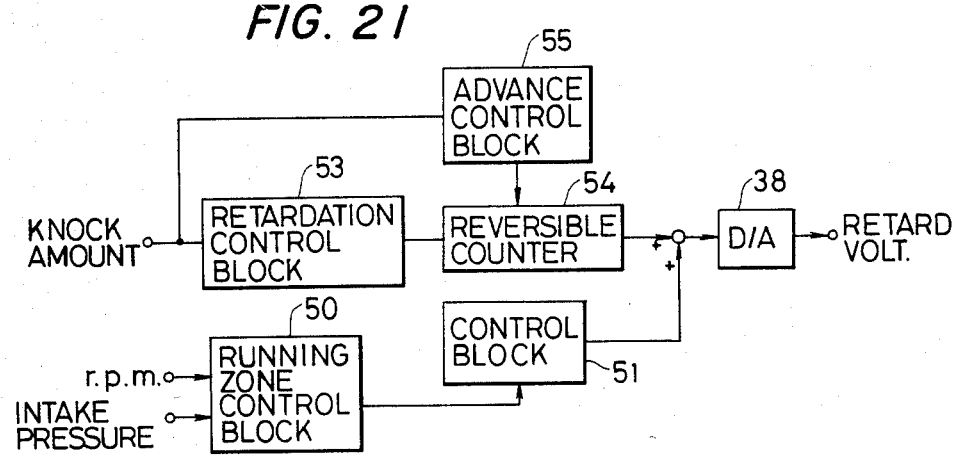
FIG. 21 is a block diagram showing the control system in a transient state.
Figure 22:
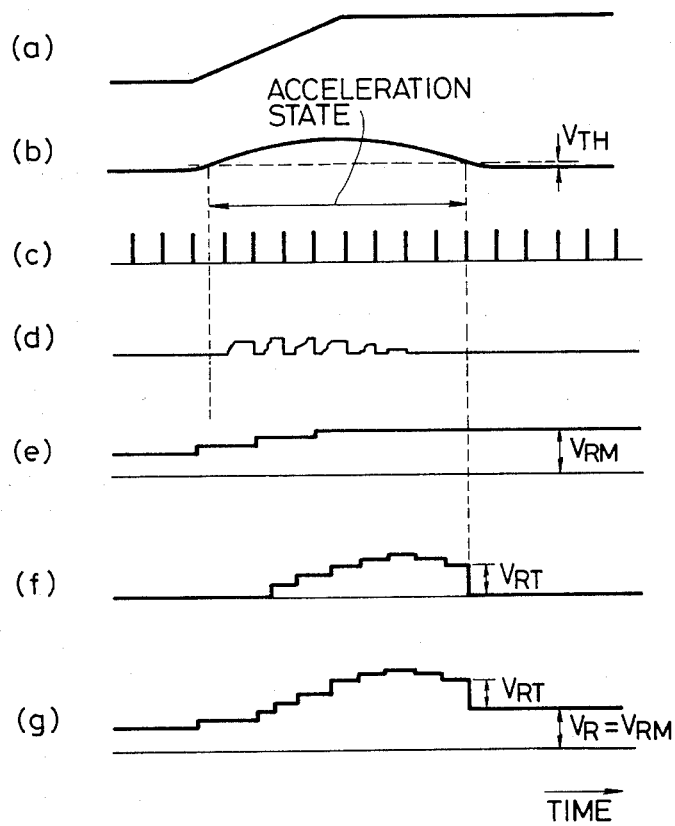
FIGS. 22(A) to 22(G) are timing charts for a description with reference to FIG. 21.

Furthermore, FIGS. 19 and 21 are diagrams showing the control concepts in the steady state and in the accelerating state of the third embodiment of the invention, and FIGS. 20 and 22 are timing charts respectively illustrating the operation of the devices of FIGS. 19 and 21.

In FIGS. 19 and 20, reference numeral 49 indicates a control block for changing the delay angle, i.e., the retardation, in accordance with the extent of knock. Numeral 50 indicates a control block for arithmetically computing respective running zones from the r.p.m. and the intake pressure. Numeral 51 indicates a control block for both the aforementioned memory 37 containing retardation values and its peripheral portions. Numeral 52 indicates a control block for changing the stored retardation value to an angularly preceding side, i.e., to an advanced side, when the knock signal is absent. In FIG. 20: (a) indicates the output signal of the signal generator 25; (b) indicates the ignition signal; (c) indicates the output waveform of the operational amplifier 48, which in turn indicates the extent of knock; and (d) and (e) respectively indicate the processing circumstances of the microcomputer 36 and the changing circumstances of the retardation value stored in the memory 37.

In FIGS. 21 and 22, moreover, reference numeral 53 indicates a control block for changing the retardation in accordance with the extent of knock when the engine is in a transitional state. Numeral 54 indicates a reversible counter which is used independently of the running zone only in the transition state to integrate the retardation values in accordance with the knock extent and to subtract the same to advance the timing when the knock signal is absent. Numeral 55 indicates a control block for conducting the advance control of the reversible counter 54.

In FIG. 22: (a) indicates the opening of the throttle valve; (b) indicates the waveform of the output of the differentiator 31; (c) indicates the ignition timing; (d) indicates the output waveform of the operational amplifier 48; (e) and (f) indicate the contents of the control block 51 and the reversible counter 54, respectively; and (g) indicates the output waveform of the D/A converter 38.

In the embodiment as thus far described, the control operations for steady state engine operation will firstly be described.

When the key switch is closed to supply electric power to the controller 22 for the first time, the microcomputer 36 has not determined the most proper retardation values, so it does not start its control operation before all the data of all the running zones are set so as to have an identical retardation.

Now, if the engine is being run at an r.p.m. of $N_0$ and an intake pipe pressure of $P_0$ (mm Hg), the control block for discriminating the running zones judges that the running zone under consideration is the zone A indicated in FIG. 17. For the running zone A, the microcomputer 36 then reads the corresponding value out of the memory 37 so that the retardation value in the control block 51 takes the value $V_{RO}$ as indicated in FIG. 18, and this value is sent to the D/A converter 38. The retardation value thus sent is converted by the D/A converter 38 into an analog voltage, which is fed to the igniter 39. In igniter 39, the ignition timing is retarded by a predetermined retardation angle $\theta_0$ in accordance with the characteristic illustrated in FIG. 16. Here, the angular position of the signal fed from the signal generator 25 to the igniter 39 takes a value $\theta_s$ as indicated in FIG. 15 in accordance with the characteristics shown in that figure for the engine r.p.m. of $N_0$ and the intake pressure $P_0$ (mm Hg) so that the igniter 39 has its ignition timing retarded from the value $\theta_s$ by the value $\theta_0$ (FIG. 16).

If knocking occurs in the engine in this state, as shown in FIGS. 10 and 11, the signal of the knock sensor 29 is fed through the amplifier 40 and the band-pass filter 41 to the comparator 43, in which it is compared with the input coming from the integrator 42, which is detecting the levels of previous and subsequent noise signals, to provide knock signal waveforms as illustrated in FIG. 11(c) or FIG. 13(b). As a result, the transistor 44 shown in FIG. 12 is rendered conductive from an instant $t_1$ so that the output of the operational amplifier 48 begins to rise, as illustrated in FIG. 13(c) or FIG. 20(c). When the knocking of the engine is intense, moreover, the output pulses of the comparator 43 are increased so that the value to be integrated by the operational amplifier 48 is augmented to an analog value corresponding to the knock extent. Moreover, this analog value is held by the capacitor 47 and is read through the D/A converter 35 into the microcomputer 36 at a subsequent instant $t_2$, i.e., at the instant of ignition. At the same time, the microcomputer 36 sends out the reset pulse illustrated in FIG. 13(d) after the reading operation and closes the switch 56 to thereby discharge the capacitor 47 for subsequent integrations.

When knocking occurs, as described hereinbefore, the microcomputer 36 judges that the retardation is insufficient in accordance with the occurrence of knocking although the retard instructing voltage value $V_{RO}$ is being generated, and conducts control so as to increase the retardation. In the control block 49, more specifically, the retardation to be effected for the knock extent at that time is arithmetically computed, as shown in FIG. 19, and this value is added to the retardation $V_{RO}$ of the zone (A), which is the engine running zone at this time. The addition is used as a retardation value $V_R$ to renew the memory and is fed from the control block 51 to the D/A converter 38, whereby the igniter 39 further increases the retardation to conduct its igniting operation in accordance with this value. These operations are repeated until the knock signal is absent. Next, when knocking disappears at an instant $t_3$ indicated in FIG. 20, the control block 52 of FIG. 19 judges this state to reduce the retardation by control contrary to the aforementioned method to thereby shift the ignition timing to the advanced side as time elapses.

More specifically, if knocking occurs, the data in the memory are increased to the retarded side. If knocking disappears, those data are gradually reduced so that they are shifted to the advanced side. Thus, the most proper retardation value for each running zone is stored in the memory. By setting, at the most proper value, the gain at which the retardation value is shifted to the retard or advanced side, the ignition timing is not excessively retarded so that the most proper ignition timing control, in which knocking is suppressed to an extent such that it exerts little influence upon the engine, can be ensured. Moreover, this control is conducted only for the data of the region designated by the control block 50 for discriminating the running zones, so that retardation values corresponding to the respective running zones are stored. As a result, the data in regions different from that of the engine state at that time are not varied so that these retardation values are held as they were before.

When the engine is in a transitional state, especially during acceleration, for example, and the running zone is to be shifted from point A to point B of FIG. 17, the control operations conducted will be described in the following.

Using the control method used in the aforementioned steady state when the engine is in a transitional state will undesirably invite errors in the memory. This is partly because the running zone of the engine in the transitional state is changing every moment so that it repeats retardations during the presence of knocking on one hand and advances in the absence thereof on the other hand, and partly because the running state will not reside in the same running zone even during the period necessary for converging the ignition timing to the most proper value. If control is conducted as in the aforementioned steady state despite the aforementioned causes, therefore, the retard data in the memory will be made to contain large errors.

On the other hand, the occurrence of knocking in the accelerating state is more intense than that in the steady state. Sufficient knock control cannot be achieved unless another control system is added. The control system added for the transitional state is illustrated in FIGS. 21 and 22.

When the throttle 26 is opened for acceleration, more specifically, when the value of the position sensor 27 is varied, as illustrated in FIG. 22(a), the output of the differentiator 31 accordingly takes a predetermined level $V_{TH}$, as illustrated in FIG. 22(b). This is judged by the microcomputer 36 as indicating that the engine is in its accelerating state. When the knock signal is detected during acceleration, moreover, the data to be retarded in a manner corresponding to the knock extent are arithmetically computed by the control block 53 and are added to the present vlaue of the reversible counter 54. Via control block 50 for discriminating the running zone, on the other hand, the retardation value corresponding to the present running zone is read out of the control block 51, and the sum of this value and the value of the aforementioned reversible counter 54 is generated as the retard output value, and is output via the D/A converter 38.

This scheme is illustrated in FIGS. 22(e), 22(f) and 22(g). FIG. 22(e) indicates that the retardation values are consecutively read out in a manner so as to correspond to the respective running zones in case the engine is accelerated so that the running zones are shifted. FIG. 22(f) indicates that the counter value is continuously increased in accordance with the knock occurrence quantity and is reduced stepwise for each predetermined time period, by the action of the control block 55, during which the knock signal is absent. FIG. 22(g) indicates the summation of the values of FIGS. 22(e) and (f), which summation is converted by the D/A converter 38 into an analog value to be fed as the retard instructing value to the igniter 39. In this case, the most proper retardation values stored in the memory for steady state operation are not changed.

Thus, retardation control during acceleration uses the retardation values stored in the memory for the steady state, and adds a retardation amount thereto in a manner so as to correspond to the knock extent at that time, so that knock control can be promptly effected. As a result, the retardation amount dictated by the reversible counter is sufficient to compensate for the shortage of retardation which would be otherwise caused during acceleration.

In the steady state and in the transitional state, on the other hand, the purposes of control are different; a highly accurate control is required for highly efficient running in the steady state, whereas quick response is required rather than high accuracy during a transition state so as to eliminate extreme knocking but achieve a high output power. Of the control block 49 of FIG. 19 and the control block 53 of FIG. 21, therefore, the latter control block 53 is to have a higher gain for retard control. Likewise, the control block 55 of FIG. 21 is set to have a higher gain than the control block of FIG. 19.

Although omitted from the foregoing description, the characteristic of retardation control may be varied according to the temperature of the cooling water. In this case, a correction is made in advance for the retardation value in accordance with the output of the water temperature sensor 30, so that the accuracy in retard control is improved so that the most proper retardation value can be promptly achieved.

In the foregoing description, moreover, the pressure in the intake manifold or the like has been used as a load detection parameter. Alternatively, the load detecting means may use the flow rate of intake air sucked into the engine. In this case, the discrimination of the respective running zones of the memory would be carried out in accordance with the air flow rate and the r.p.m. Moreover, in the foregoing, the detection of the transition state was conducted by differentiating the output voltage of a position sensor 27 connected directly to the throttle valve 26, and by comparing the differentiated voltage with a predetermined value. Alternatively, it is possible to discriminate the transitional state in terms of the intake pressure or the flow rate of intake air.

In the above embodiments, the stored content in the memory 37 is held even if the key switch is turned off. As a result, so long as the battery itself is not removed from the vehicle, control to achieve the most proper ignition timing can be executed which conducting the detection and determining operations at all times in accordance with the aging of the engine.

On the other hand, the setting of the retardation values in the memory 37 is subjected to data storage by the determinations and operation of the microcomputer 36. When the system of this embodiment is first mounted on the vehicle, however, there may be no setting of suitable data. This invites a possiblity that intense knocking may take place before the self generation of timing data is completed. In order to prevent that possibility, it is sufficient if all the data are set at a predetermined retardation value when the system is first mounted on the vehicle. When the microcomputer conducts its operations subsequent to this state, moreover, a state may be caused in accordance with the running of the engine such that zones which are set with the true retardation data necessary for control and other zones which do not coexist. In this case, however, the values for the other zones can be determined by interpolation using the data of the zones where control has previously been exercised.

Figure 23:
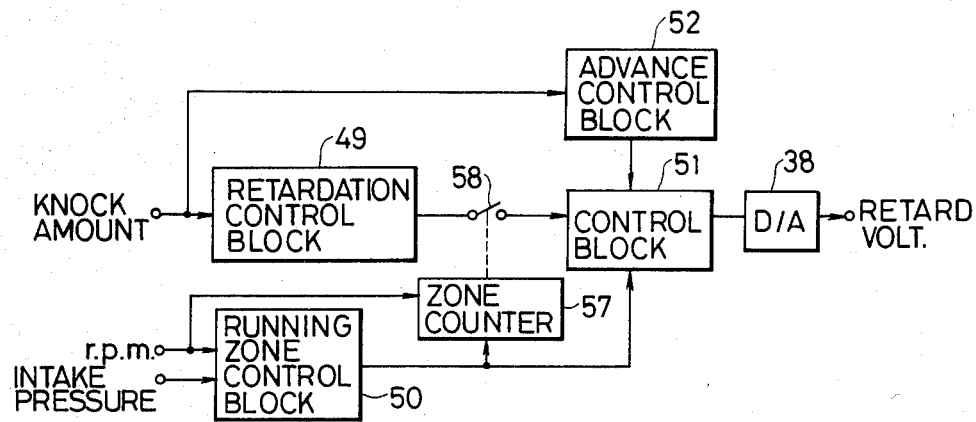
FIG. 23 is a block diagram showing a fourth embodiment of the control system in an ordinary state.
Figure 24:
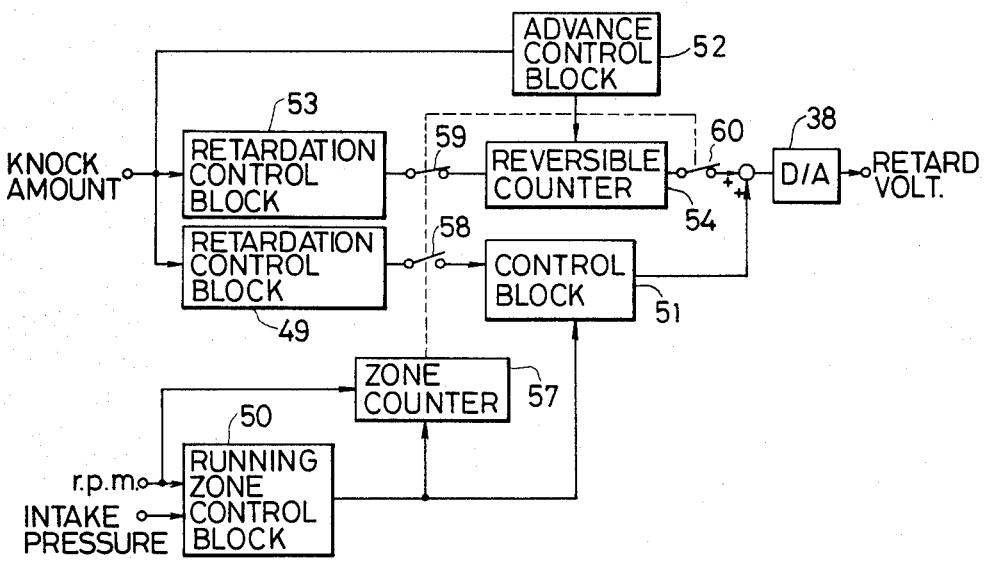
FIG. 24 is a block diagram showing the fourth embodiment of the control system in a transient state.

FIGS. 23 and 24 are block diagrams showing a fourth embodiment of the present invention, in which the most proper ignition timing is determined only when the engine is in an identical running zone for a predetermined number of consecutive ignitions. As a result, only accurate data in the steady state of the engine is determined so that the accuracy of the retardation data can be further enhanced.

In FIGS. 23 and 24, numeral 57 indicates a zone counter for turning on a switch 58 on the basis of the output of the control block 50 for discriminating running zones, only when the r.p.m. signal pulses continue at predetermined values, e.g., where more than five consecutive readings fall within an identical running zone, and for turning off the same switch 58 the instant the running zone is changed. Further, numerals 59 and 60 indicate switches adapted to be controlled by the above mentioned zone counter 57 to operate in a mode opposite to that of the switch 58. If the r.p.m. signal pulses continue, as in the aforementioned case in which the engine is being run repeatedly in the identical running zone, the zone counter 57 detects the r.p.m. signal pulses and judges that the engine is in a steady state running mode, and turns on the switch 58 and turns off the switches 59 and 60 whereby the retardation value stored in the memory 37 is renewed in accordance with the extent of the knock having occurred at that time.

Further, when the throttle 26 is opened for acceleration, more specifically, when the value of the position sensor 27 is varied, as illustrated in FIG. 22(A), the output of the differentiator 31 accordingly assumes a predetermined level $V_{TH}$, as illustrated in FIG. 22(B). This is judged by the microcomputer 36 as indicating that the engine is in an accelerating state. As a result of the change in the running state, the switch 58 is turned off whereas the switches 59 and 60 are turned on. When a knock signal is detected during acceleration, moreover, retarding data corresponding to the extent of knock are arithmetically computed by the control block 53 and are added to the present value of the reversible counter 54. By control block 50 for discriminating the running zone, on the other hand, the retardation value corresponding to the present running zone is read out of the control block 51, and the sum of this value and the value of the aforementioned reversible counter 54 is generated as the retard output value and is output from the D/A converter 38.

What is claimed is:

1. A knocking control system for an internal combustion engine, comprising; means for detecting a vibratory acceleration of said internal combustion engine to produce a vibratory output signal; knock detector means for removing noise components from said vibratory output signal to produce a knock signal whose signal level corresponds to the intensity of knocking; means for detecting a load condition of said internal combustion engine and producing a load output signal; means for receiving said knock signal and said load output signal and producing a digital output of detected load condition; means for detecting a speed of said internal combustion engine and producing a speed output to said knock detector means; means for storing a reference control value for supressing knocking; said reference control value corresponding to the detected load condition and the detected engine speed; means for producing a control output signal from said knock signal and said reference control value for controlling engine ignition, and means for resetting said knock detector means at an interval corresponding to the ignition interval of said engine.

2. A device as claimed in claim 1, said means for producing a control output signal comprising processing means, said knock signal being fed to said processing means.

3. A device as claimed in claim 1, wherein said load condition detecting means comprises means for detecting one of the intake air pressure and intake air flow rate of said engine.

4. A device as claimed in claim 2, said storing means comprising memory means for storing a plurality of said reference control values, comprising ignition retard values, in the form of a map.

5. A device as claimed in claim 4, wherein said load condition detecting means comprises means for detecting the intake air pressure of said engine, said memory map containing a plurality of zones each keyed to a range of engine r.p.m. and intake air pressure values.

6. A device as claimed in claim 5, said processing means including means for determining a present operating zone, an ignition retard value being read from said memory means in correspondence to the operating zone thus determined.

7. A device as claimed in claim 6, said processing means including means for correcting said read out ignition retard value on the basis of the level of said knock signal, and means for outputting said corrected value, comprising said control output signal, to ignition timing control means.

8. A device as claimed in claim 7, said processing means further comprising means for updating said memory means by substituting said corrected value for said read out value with respect to the determined operating zone.

9. A device as claimed in claim 7, wherein said ignition timing control means comprises phase shift control means for delaying an ignition pulse by an amount in correspondence to said control output signal, and switch means controlled by the output of said phase shift control means; said switch means being coupled to an ignition coil of said engine.

10. A device as claimed in claim 8, said processing means further including means for decreasing the ignition retard value in response to the absence of said knock signal.

11. A device as claimed in claim 8, further including means for detecting an accelerating state of said engine, said processing means including means for controlling engine ignition in accordance with the level of said knock signal in response to said accelerating state detection.

12. A device as claimed in claim 11, said accelerating state ignition control means including a reversible counter for increasing or decreasing a retard value, a sum of an ignition retardation value corresponding to the instantaneout operating zone and the content of said reversible counter being generated to form an ignition retard output value.

13. A device as claimed in claim 12, wherein the content of said memory means remains unchanged during detection of said accelerating state.

14. A device as claimed in claim 5, wherein each of said memory map zones initially contains the same predetermined ignition retard value.

15. A device as claimed in claim 14, wherein said memory means further contains a program for said processing means.

16. A device as claimed in claim 8, wherein said processing means includes switch means activated only when said engine operates in the same zone for a predetermined number of consecutive cycles.

17. A device as claimed in claim 16, wherein said switch means controls the entrance of correction values into said memory means, whereby ignition retard values stored in said memory means in correspondence with said operating zones are prevented from being updated in response to the operation of said switch means, said switch means, when activated, allowing updating of said retard value for the respective operating zone.

18. A knocking control system for an internal combustion engine, comprising: means for detecting a vibratory acceleration of said internal combustion engine to produce a vibratory output signal; knock detector means for removing noise components from said vibratory output signal to produce a knock signal whose signal level corresponds to the intensity of knocking; said knock detector means comprising a discriminator for discriminating between said noise components and a knocking component, and an integrator for integrating said knocking component to obtain said knock signal; means for detecting a load condition of said interal combustion engine and producing a load output signal; means for receiving said knock signal and said load output signal and producing a digital output of detected load condition; means for detecting a speed of said internal combustion engine and producing a speed output to said knock detector means; means for storing a reference control value for supressing knocking; said reference control value corresponding to the detected load condition and the detected engine speed; and means for producing a control output signal from said knock signal and said reference control value for controlling engine ignition.

19. A knocking control system for an internal combustion engine, comprising: means for detecting a vibratory acceleration of said internal combustion engine to produce a vibratory output signal; knock detector means for removing noise components from said vibratory output signal to produce a knock signal whose signal level corresponds to the intensity of knocking; means for detecting a load condition of said internal combustion engine and producing a load output signal; means for receiving said knock signal and said load output signal and producing a digital output of detected load condition; means for detecting a speed of said internal combustion engine and producing a speed output to said knock detector means; means for storing a reference control value for supressing knocking; said reference control value corresponding to the detected load condition and the detected engine speed; means for producing a control output signal from said knock signal and said reference control value for controlling engine ignition; and means for detecting an accelerating state of said engine.

20. A knocking control system for an internal combustion engine, comprising: means for detecting a vibratory acceleration of said internal combustion engine to produce a vibratory output signal; knock detector means for removing noise components from said vibratory output signal to produce a knock signal whose signal level corresponds to the intensity of knocking; said knock detector means comprising a band-pass filter for extracting a knocking component, an integrator for detecting a background noise level, and a comparator for comparing the levels of said filter and said integrator; means for detecting a load condition of said internal combustion engine and producing a load output signal; means for receiving said knock signal and said load output signal and producing a digital output of detected load condition; means for detecting a speed of said internal combustion engine and producing a speed output to said knock detector means; means for storing a reference control value for supressing knocking; said reference control value corresponding to the detected load condition and the detected engine speed; and means for producing a control output signal from said knock signal and said reference control value for controlling engine ignition.

* * * * *